(12) United States Patent
Browne et al.

(10) Patent No.: US 9,325,771 B2
(45) Date of Patent: Apr. 26, 2016

(54) SYSTEMS AND METHODS FOR DATA MANAGEMENT

(71) Applicant: THEPLATFORM, LLC, Seattle, WA (US)

(72) Inventors: David Browne, Seattle, WA (US); Brian Burkhart, Seattle, WA (US); Brandon Lonac, Edmonds, WA (US)

(73) Assignee: thePlatform, LLC, Seattle, WA (US)

( * ) Notice: Subject to any disclaimer, the term of this patent is extended or adjusted under 35 U.S.C. 154(b) by 205 days.

(21) Appl. No.: 14/024,239

(22) Filed: Sep. 11, 2013

(65) Prior Publication Data

US 2015/0074171 A1 Mar. 12, 2015

(51) Int. Cl.
G06F 15/16 (2006.01)
H04L 29/08 (2006.01)
H04L 12/24 (2006.01)

(52) U.S. Cl.
CPC ............... *H04L 67/02* (2013.01); *H04L 41/00* (2013.01); *H04L 67/28* (2013.01); *H04L 41/0806* (2013.01)

(58) Field of Classification Search
CPC ..... H04L 67/02; H04L 67/06; H04L 41/0226; H04L 56/306; H04L 67/327
See application file for complete search history.

(56) References Cited

U.S. PATENT DOCUMENTS

| | | | | |
|---|---|---|---|---|
| 7,631,101 B2* | 12/2009 | Sullivan | ............ | H04L 29/12066 709/203 |
| 9,197,600 B2* | 11/2015 | L'Heureux | ............. | H04L 63/02 |
| 2003/0058863 A1* | 3/2003 | Oost | .............................. | 370/392 |
| 2004/0103206 A1* | 5/2004 | Hsu | ........................ | H04L 69/329 709/230 |
| 2006/0098619 A1* | 5/2006 | Nix | ........................ | H04M 7/126 370/352 |
| 2006/0230098 A1* | 10/2006 | Shen | ..................... | H04L 67/327 709/201 |
| 2008/0080513 A1* | 4/2008 | Kang | ..................... | H04L 12/66 370/392 |
| 2008/0263137 A1* | 10/2008 | Pattison | .................. | H04L 12/66 709/203 |
| 2012/0151086 A1* | 6/2012 | Xie | ..................... | H04L 67/2823 709/232 |
| 2012/0240176 A1* | 9/2012 | Ma et al. | ........................ | 725/114 |
| 2013/0242996 A1* | 9/2013 | Varvello et al. | ................ | 370/392 |
| 2014/0376548 A1* | 12/2014 | Naven | ..................... | H04L 49/30 370/389 |

* cited by examiner

*Primary Examiner* — Jonathan Bui
(74) *Attorney, Agent, or Firm* — Ballard Spahr LLP

(57) ABSTRACT

Systems and methods for managing data are disclosed. One method can comprise receiving a data request at a first data agent and determining whether the first data agent is configured to satisfy the data request. If the first data agent is configured to satisfy the data request, the data request can be processed via the first data agent. If the data agent is not configured to satisfy the data request, the data request can be transmitted to a second data agent.

20 Claims, 5 Drawing Sheets

SYSTEMS AND METHODS FOR DATA MANAGEMENT

BACKGROUND

Data transfer protocols such as file transfer protocol (FTP), hypertext transfer protocol (HTTP), Aspera transfer software, and SSH file transfer protocol (SFTP) are often implemented to transmit data between computing devices. Such data transfer protocols are file agnostic and are not configured to make intelligent, data dependent decisions regarding the transfer of data. These and other shortcomings are identified and addressed by the disclosure.

SUMMARY

It is to be understood that both the following general description and the following detailed description are exemplary and explanatory only and are not restrictive, as claimed. Provided are methods and systems for data management. The methods and systems described herein, in one aspect, provide an intelligent transfer protocol configured to analyze data and make intelligent decisions as to how to transfer the data.

In an aspect, the methods can comprise receiving a data request at a first data agent and determining whether the first data agent is configured to satisfy the data request. In another aspect, the data request relates to a transfer protocol. If the first data agent is configured to satisfy the data request, the data request can be processed via the first data agent. If the data agent is not configured to satisfy the data request, the data request can be transmitted to a second data agent. In a further aspect, the second data agent is associated with the transfer protocol.

In yet another aspect, provided are systems that can comprise a plurality of computing devices, wherein one or more of the plurality of computing devices is associated with one or more of a plurality of transfer protocols. The systems can also comprise a first data agent in communication with a first group of the one or more of the plurality of computing devices, wherein the first data agent is configured to satisfy data requests relating to the first group of the one or more of the plurality of computing devices. The system can further comprise a second data agent in communication with a second group of the one or more of the plurality of computing devices, wherein the second data agent is configured to satisfy data requests relating to the second group of the one or more of the plurality of computing devices, and wherein one or more of the first data agent and the second data agent is further configured to delegate data requests to the other.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1A:
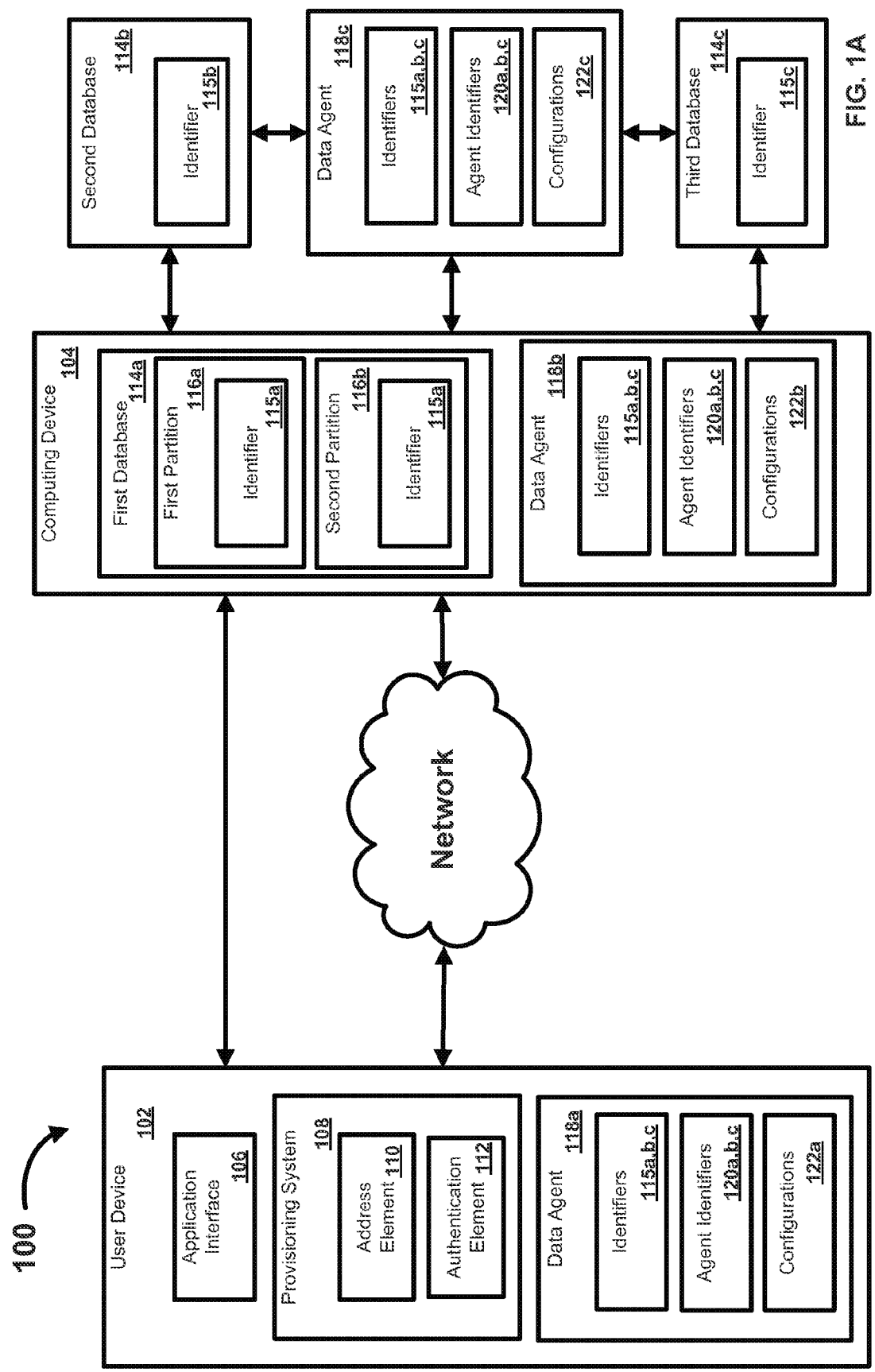
FIG. 1A is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The methods and systems described herein, in one aspect, provide an intelligent transfer protocol configured to analyze the underlying data and make intelligent decisions as to how to transfer the data. In another aspect, one or more data agents can be configured to receive a data request, such as a data transfer request, and determine the capability of the receiving data agent to satisfy the request. If a data agent is configured to satisfy the data request, the data request can be processed. If a data agent is not configured to satisfy the data request, the data request can be transmitted to another data agent and the process can be repeated. In another aspect, a data agent can delegate data requests to one or more other agents. As such the delegating agent (originator) can track the data request to monitor the status of the request. As an example, each delegated request can be associated with an identifier to facilitate monitoring the status of the request and to ensure the request is properly handled by delegate agents.

Figure 1B:
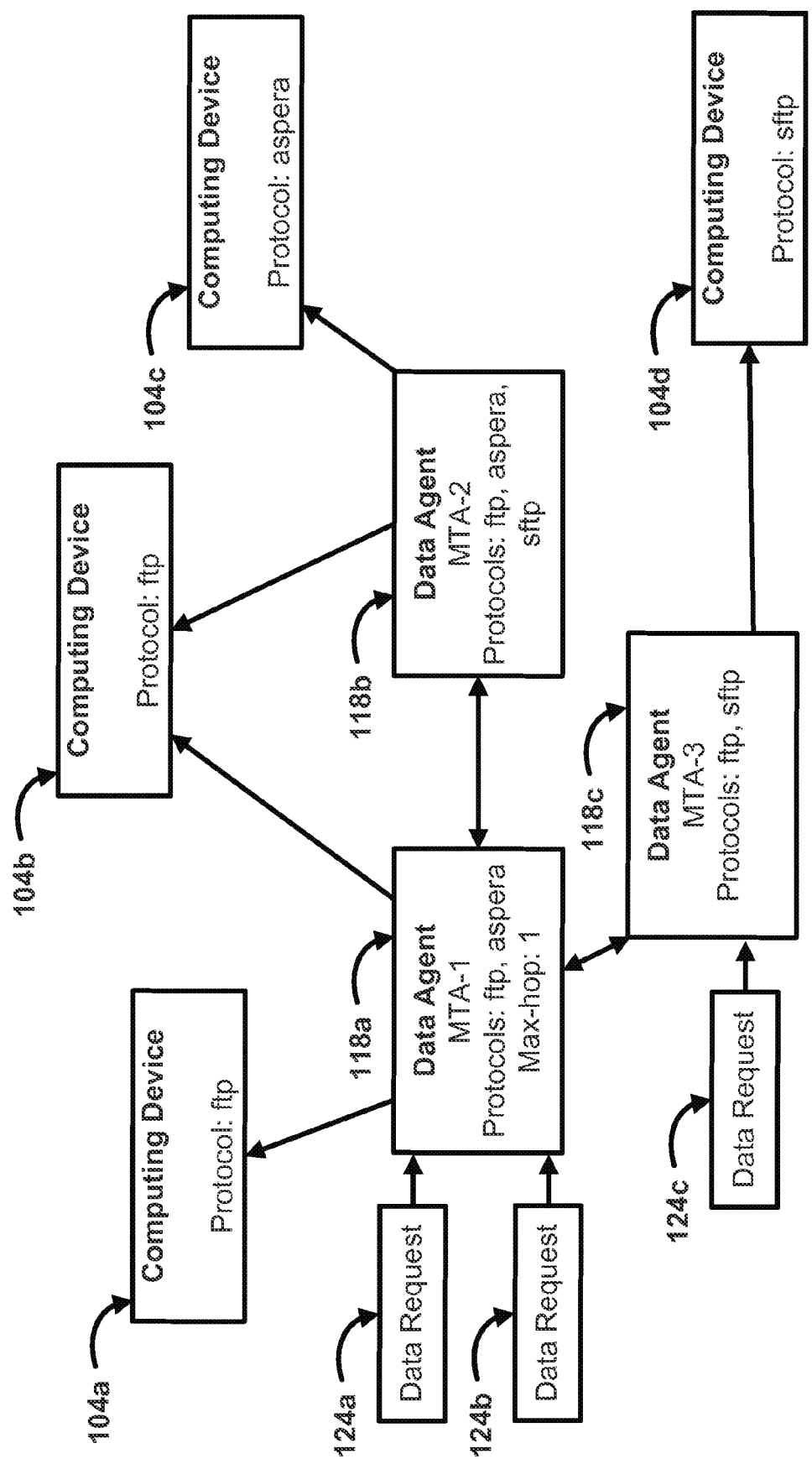
FIG. 1B is a block diagram of an exemplary system and network.

FIGS. 1A-1B illustrate various aspects of an exemplary system in which the present methods and systems can operate. The present disclosure relates to systems and methods for managing data. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a user device 102 in communication with a computing device 104 such as a server, for example. The computing device 104 can be disposed locally or remotely relative to the user device 102. As an example, the user device 102 and the computing device 104 can be in communication via a private or public network such as the Internet. Other forms of communications can be used, such as wired and wireless telecommunication channels, for example.

In an aspect, the user device 102 can be an electronic device, such as a computer, a smartphone, a laptop, a tablet, a set top box, or other device capable of communicating with the computing device 104. As an example, the user device 102 can comprise an application interface 106 for providing an interface to a user to interact with the user device 102 and/or the computing device 104. The application interface 106 can be any interface for presenting information to the user and receiving a user feedback such as a web interface (e.g., Internet Explorer, Mozilla Firefox, Google Chrome, Safari, or the like). Other software, hardware, and/or interfaces can be used to provide communication between the user and one or more of the user device 102 and the computing device 104. As an example, the application interface 106 can request or query various files from a local source and/or a remote source.

In an aspect, the user device 102 can comprise a provisioning system 108 configured to, among other things: authenticate the user device 102 with a particular network; install drivers; configure a modem; set up a wired or wireless Local Area Network (LAN); secure an operating system; configure browser provider-specifics; provision electronic mail (e.g. create mailboxes and aliases); configure electronic communications; install additional support software; install add-on packages; and the like. As an example, the provisioning system 108 can be configured to provision and/or monitor one or more address elements 110 and an authentication element 112 to the user device 102.

In an aspect, the address element 110 can be a uniform resource identifier (URI) (e.g., a uniform resource locator (URL)), a network address, an Internet address, or the like. As an example, the address element 110 can be relied upon to establish a communication session between the user device 102 and the computing device 104. As a further example, the address element 110 can be any identifier to distinguish the user device 102 from other devices intercommunicating with the computing device.

In an aspect, the authentication element 112 can be credentials, a token, a character, a string, or the like, for differentiating one user or user device from another user or user device. In an aspect, the authentication element 112 can comprise information for authenticating the user and/or user device 102 with the computing device 104 to facilitate access to data and/or services. As an example, the computing device 104 can be configured to receive and validate the authentication element 112 to facilitate a secure communication between the user device 102 and one or more of the computing devices such as computing device 104.

In an aspect, the computing device 104 can be a server for communicating with the user device 102. As an example, the computing device 104 can manage and/or monitor the inter-communication between the user device 102 and one or more databases 114a, 114b, 114c for sending and receiving data therebetween. In an aspect, the databases 114a, 114b, 114c can store a plurality of information sets (e.g. data sets, files, web pages, etc.). As an example, the user device 102 can request an information set from the databases 114a, 114b, 114c. As a further example, the user device 102 can retrieve one or more information sets from the databases 114a, 114b, 114c. In another aspect, one or more identifiers 115a, 115b, 115c can be associated with one or more of the information sets stored on and/or retrievable by the computing device 104. As an example, one or more identifiers 115a, 115b, 115c can comprise a uniform resource identifier (URI) (e.g., a uniform resource locator (URL)), a network address, an Internet address, a file name, a character string, token, or the like. As a further example, the one or more identifiers 115a, 115b, 115c can direct the application interface 106 to request or query a particular information set. The requested information set can be stored locally to the computing device 104 or remotely, such as in databases 114a, 114b, 114c for example. As an example, one or more of the databases 114a, 114b, 114c can be integrated with the computing device 104. As a further example, one or more databases 114a, 114b, 114c can be disposed remotely from the computing device 104.

In an aspect, one or more of the databases 114a, 114b, 114c, such as a first database 114a, can comprise one or more partitions 116a, 116b. As an example, the one or more of the partitions 116a, 116b can comprise a division of first database 114a or its constituent elements into distinct independent parts. Such partitioning can facilitate improved manageability, performance, and/or resource availability. In an aspect, a computing device, such as computing device 104, can perform load balancing over one or more of the databases 114a, 114b, 114c and/or partitions 116a, 116b. As an example, load balancing can comprise distributing storage and/or workload across multiple databases, partitions, computers or a computer cluster, network links, central processing units, disk drives, or other resources, to achieve optimal resource utilization, maximize throughput, minimize response time, and avoid overload. Using multiple components with load balancing, instead of a single component, can increase reliability through redundancy. As a further example, load balancing can be facilitated by migrating (e.g., replicating, copying, moving, dividing, etc.) data between multiple locations. In an aspect, data can be migrated from the first database 114a to one or more of a second database 114b and a third database 114c. In another aspect, data can be migrated from a first partition 116a to a second partition 116b. In yet another aspect, data migration can comprise transferring (e.g., replicating, copying, moving, dividing, etc.) data between storage types, formats, or computer systems. As an example, data migration can be performed programmatically to achieve an automated migration.

In an aspect, one or more data agents 118a, 118b, 118c can be stored on and/or in communication with one or more of the user device 102, the computing device 104, and/or database 114a, 114b, 114c. As an example, the one or more data agents 118a, 118b, 118c can be or comprise software installed on a host such as a computing device (e.g., user device 102, computing device 104, network device, node, access point, server, etc.) configured to participate as data transfer mechanisms. In another aspect, the one or more data agents 118a, 118b, 118c are independent of a server/client topology. As an example, each one or more data agents 118a, 118b, 118c can be a peer-to-peer (i.e., agent-to-agent) topology. As a further example, a data agent 118a, 118b, 118c can be designated as the originating agent to control the acceptable bounds (e.g., timeouts, number of hops, routing, etc.) of a transfer.

In an aspect, one or more data agents 118a, 118b, 118c can be configured or updated with an identifier 120a, 120b, 120c (e.g., hostname) associated with other data agents 118a, 118b, 118c in a network, or, if appropriate, on other networks. In another aspect, one or more data agents 118a, 118b, 118c can be configured with information relating to computing devices, servers, storage devices, database, and the like, with which the data agents 118a, 118b, 118c may interact. As an example, one or more of the data agents 118a, 118b, 118c can comprise identifiers 115a, 115b, 115c associated with one or more database 114a, 114b, 114c. In a further aspect, one or more data agents 118a, 118b, 118c can comprise configurations 122a, 122b, 122c relating to the capabilities of a respective data agent 118a, 118b, 118c. As an example, configurations 122a, 122b, 122c can comprise the underlying protocols within which the respective data agent 118a, 118b, 118c is capable of operating.

In an aspect, one or more data requests 124 can be transmitted to and/or between one or more data agents 118a, 118b, 118c. As an example, one or more data agents 118a, 118b, 118c can be configured as a RESTful endpoint (e.g., a portion of architecture using Representational State Transfer (REST)). The data requests 124 may originate from one or more data agents 118a, 118b, 118c or an external source such as a coordinating workflow system.

In an aspect, the first one of the one or more data agents 118a, 118b, 118c to receive a data request 124 can be referred to as an originating agent. Upon receiving a data request 124 one or more data agents 118a, 118b, 118c can determine a source (e.g., internal to a network of one or more data agents, external to a network of data agents) of the received data request 124. Upon receiving a data request 124 one or more data agents 118a, 118b, 118c can determine the ability to satisfy the data request 124. As an example, a receiving one of the data agents 118a, 118b, 118c can determine if it is capable of working with the underlying protocol associated with the data request 124. As another example, a receiving one of the data agents 118a, 118b, 118c can determine if the receiving one of the data agents 118a, 118b, 118c is configured to communicate with the source host and destination host required to satisfy the data request 124. As another example, a receiving one of the data agents 118a, 118b, 118c can determine if the receiving one of the data agents 118a, 118b, 118c is configured to process the media file type(s) being requested by the data request 124. As a further example, a receiving one of the data agents 118a, 118b, 118c can determine if the receiving one of the data agents 118a, 118b, 118c is configured to satisfy the type of request (e.g., move, copy, delete, analysis, etc.) associated with the data request 124. In another aspect, if the receiving one of data agents 118a, 118b, 118c can satisfy the data request 124, a job identifier can be transmitted to the calling application and asynchronously performs the operation.

In an aspect, one of the one or more data agents 118a, 118b, 118c such as the originating agent can delegate a request to another data agent 118a, 118b, 118c. As an example, one or more data agents 118a, 118b, 118c may not be configured to satisfy a data request 124 and can delegate the data request 124 to another data agent 118a, 118b, 118c. As a further example, a fairness algorithm can be implemented to select one or more data agent 118a, 118b, 118c to which a data request 124 can be delegated. In an aspect, a fairness algorithm (e.g., min-max fairness) can be implemented by an allocation of resources if the allocation is feasible and an attempt to increase the allocation of any participant necessarily results in the decrease in the allocation of some other participant with an equal or smaller allocation. In another aspect, a fairness algorithm can be implemented such that a new configuration (e.g., data flow, transfer protocol) receive no larger share of the resources than a comparable configuration or flow. Other fairness algorithms can be used. In an aspect, a data request 124 can be delegated to one or more data agents 118a, 118b, 118c based on a known identifier of the one or more data agents 118a, 118b, 118c.

In an aspect, one or more data agents 118a, 118b, 118c can provide a RESTful endpoint where job status may be requested at any time by an external service or another data agent 118a, 118b, 118c. In another aspect, a job (e.g., one or more data requests) can be identified as originating locally or delegated from another source. When the status of a given job is requested, one or more data agents 118a, 118b, 118c can determine if the job is active and if it either originated with itself or is being run locally. If the job is not known (e.g., the identifier is not recognized by one or more agents), it returns an error. If it is known and active, and the job is running locally it responds with all relevant status information. In an aspect, once a first data agent (e.g., data agent 118b) has delegated a job to a second data agent (e.g., data agent 118c), the first data agent can poll the second data agent, such as on a periodic basis, to gather a job status. If the polling first data agent is not the originating data agent, the job status can be persisted, thereby awaiting a call or poll from the data agent that was the original delegator (e.g., data agent 118a).

In an aspect, transferring data across a network may require considerations over-and-above the regular transport requirements of a digital file. Such consideration can comprise delivery guarantee by means of checksum verification or other techniques; analysis of media specific properties embedded in the files such as bitrate, frame rate, audio channels, closed captioning etc.; package consistency of manifest based media files to ensure all components are present and the manifest accurately represents the contents of the package, attributes related to digital rights management (DRM) of media files such as the protect scheme used or the content protection key id; protocol arbitration between heterogeneous servers and their underlying protocols, and/or asynchronous operation to better utilize computing resource whilst large mezzanine files are being transported across a network.

In an aspect, one or more data agents 118a, 118b, 118c can be configured to work with underlying protocols such as ftp, stfp, fasp etc. The implementation of a protocol can comprise establishing an authorized session with a data agent 118a, 118b, 118c, initiating a request to start a job between either the initiator and a server, or server to server, polling one or more data agents 118a, 118b, 118c for job status, and/or closing the authorized session.

In an aspect, one or more data agents 118a, 118b, 118c can be configured to delete data such as deleting source files when a requested option relating to the source file is complete. One or more data agents 118a, 118b, 118c can be configured to analyze data and/or return information to the requestor. One or more data agents 118a, 118b, 118c can be configured to validate a delivery of data such as via check-summing, package validation, or other techniques to validate that source and destination data have equality. Equality many not require identical data. For example, equality can factor in loss, noise, compression, or other variables. One or more data agents 118a, 118b, 118c can be configured to authenticate a user and/or device to perform operations via the one or more data agents 118a, 118b, 118c. Credentials are passed through to validate the identity of the source and a timed authentication token is returned. One or more data agents 118a, 118b, 118c can be configured to upload, download, transfer, and/or delete data to/from one or more data agents 118a, 118b, 118c. One or more data agents 118a, 118b, 118c can be configured to request a status of a supplied job reference (e.g., data request identifier) including any analysis, package consistency information or error conditions when the job is complete. Incomplete jobs can return a percent complete metric.

FIG. 1B illustrates examples of an intelligent data transfer protocol embodied by the systems and methods of the present disclosures. As an example only, a first computing device 104a and a second computing device 104b can support a first protocol such as FTP protocol. As another example, a third computing device 104c can support a second protocol such as ASPERA. As a further example, a fourth computing device 104d can support a third protocol such as SFTP. Any number of devices can support any number of protocols. The devices and protocols shown in FIG. 1B are for example only. The first, second, and third protocols can be any protocols, software, transfer mechanism, and the like.

In an aspect, a first data agent 118a can have a known relationship (e.g., connection, communication, etc.) with computing device 104a, computing device 104b, a second data agent 118b, and a third data agent 118c. The data agent 118a can be configured to support the first protocol (e.g., FTP) and the second protocol (e.g., ASPERA). In another aspect, the data agent 118b can have a known relationship with data agent 118a, computing device 104b, and computing device 104c. The data agent 118b can be configured to support the first protocol (e.g., FTP), the second protocol (e.g., ASPERA), and the third protocol (e.g., SFTP). In a further aspect, data agent 118c can have a known relationship with data agent 118a and computing device 104d. The data agent 118c can be configured to support the first protocol (e.g., FTP) and the third protocol (e.g., SFTP). The data agents and protocols shown in FIG. 1B are for example only. The first, second, and third protocols can be any protocols, software, transfer mechanism, and the like. Data agents can be configured to communicate with any number of other agents and/or devices. Data agents can be configured to manage data using any number of protocols.

In an aspect, a first data request 124a can be received by data agent 118a (e.g., media transfer agent (MTA-1)). As an example, the first data request 124a can be a transfer request to transfer a media file from computing device 104a to computing device 104b. The first data request 124a can be serviced (e.g., satisfied, processed, executed, etc.) locally by data agent 118a because data agent 118a has a known relationship with computing device 104a and with computing device 104b and can also operate the underlying protocol of FTP.

In another aspect, a second data request 124b can be received by data agent 118a to transfer a media file from computing device 104c to computing device 104b. The second data request 124b cannot be satisfied locally by data agent 118a because data agent 118a has no known relationship with computing device 104c. Data agent 118a can delegate the request. For example, data agent 118a has a known relationship with both data agent 118b (e.g., MTA-2) and data agent 118c (e.g., MTA-3), but may be unaware of the capabilities of either. As a further example, a fairness algorithm (e.g., min-max fairness, delegation routine, etc.) can be implemented to select a delegate data agent (MTA) such as data agent 118c (e.g., MTA-3). As such, data agent 118a delegates the second data request 124b, setting itself as the originating agent, and setting the maximum hops to 1 (or any configured value) and current hop count to 1. In an aspect, data agent 118c receives the request and determines that data agent 118c does not have a known relationship with computing device 104c. It can also be determined that data agent 118c has no known relationships with any other data agent besides data agent 118a and that data agent 118a is the originating agent. Accordingly, there is no option but to decline the second data request 124*b*. In this example, even if data agent 118*c* did have a known relationship with another data agent, a second delegation would exceed the maximum hops specified in the second data request 124*b* and would not be allowed. As a further example, data agent 118*a* can delegate the second data request 124*b* to data agent 118*b*, which has a known relationship with the both computing device 104*b* and computing device 104*c*, and can operate the underlying protocols. Data agent 118*b*, initiates a transfer using itself as a protocol broker (the underlying protocols are different between computing device 104*b* and computing device 104*c*) and returns a job reference to data agent 118*a*, who then sets up a polling timer, and returns the job reference to the calling application which would also be expected to poll on an interval.

In a further aspect, a third data request 124*c* can be received by data agent 118*c* to transfer a media file from computing device 104*b* to computing device 104*c*. The third data request 124*c* cannot be satisfied locally by data agent 118*c* because it has no known relationship with computing device 104*b* or computing device 104*c*. Data agent 118*c* will now attempt to delegate the third data request 124*c*. It has a known relationship only with data agent 118*a* and can select data agent 118*a* as a potential delegate. Data agent 118*c* delegates the third data request 124*c*, setting itself as the originating agent, and setting the maximum hops to 5 (or other configured value) and current hop count to 1. Data agent 118*a* receives the third data request 124*c* and notes that it does not have a known relationship with computing device 104*c*. Data agent 118*a* has a known relationship with data agent 118*c*, but it is the originating agent. As such, data agent 118*c* can attempt to delegate to its only other known agent data agent 118*b*. Data agent 118*c* can delegate because it does not violate the maximum hops constraint. Data agent 118*b*, which does have a known relationship with the both computing device 104*b* and computing device 104*c*, and can operate the underlying protocols, would initiate a transfer and return a job reference (e.g., identifier) to data agent 118*a*, which then sets up a polling timer, and returns the job reference to data agent 118*c*, which can also set up a polling timer to monitor the status of the delegated third data request 124*c*.

Figure 2:
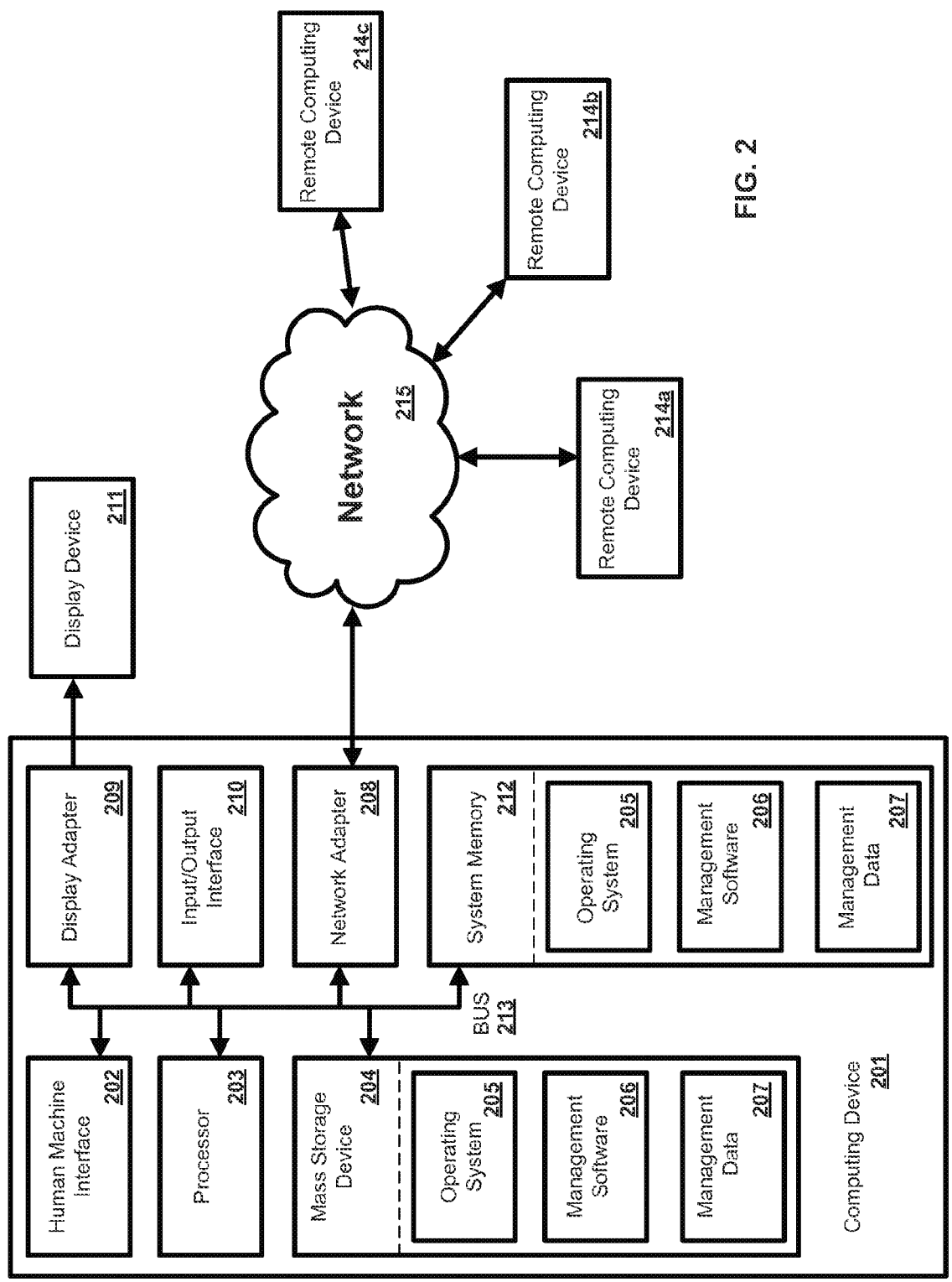
FIG. 2 is a block diagram of an exemplary computing system.

In an exemplary aspect, the methods and systems can be implemented on a computing system such as computing device 201 as illustrated in FIG. 2 and described below. By way of example, one or more of the user device 102 and the computing device 104 of FIGS. 1A-1B can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, management software 206, management data 207, a network adapter 208, system memory 212, an Input/Output Interface 210, a display adapter 209, a display device 211, and a human machine interface 202, can be contained within one or more remote computing devices 214*a,b,c* at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as management data 207 and/or program modules such as operating system 205 and management software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and management software 206. Each of the operating system 205 and management software 206 (or some combination thereof) can comprise elements of the programming and the management software 206. Management data 207 can also be stored on the mass storage device 204. Management data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and common-place in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of management software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (A.I.) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 3:
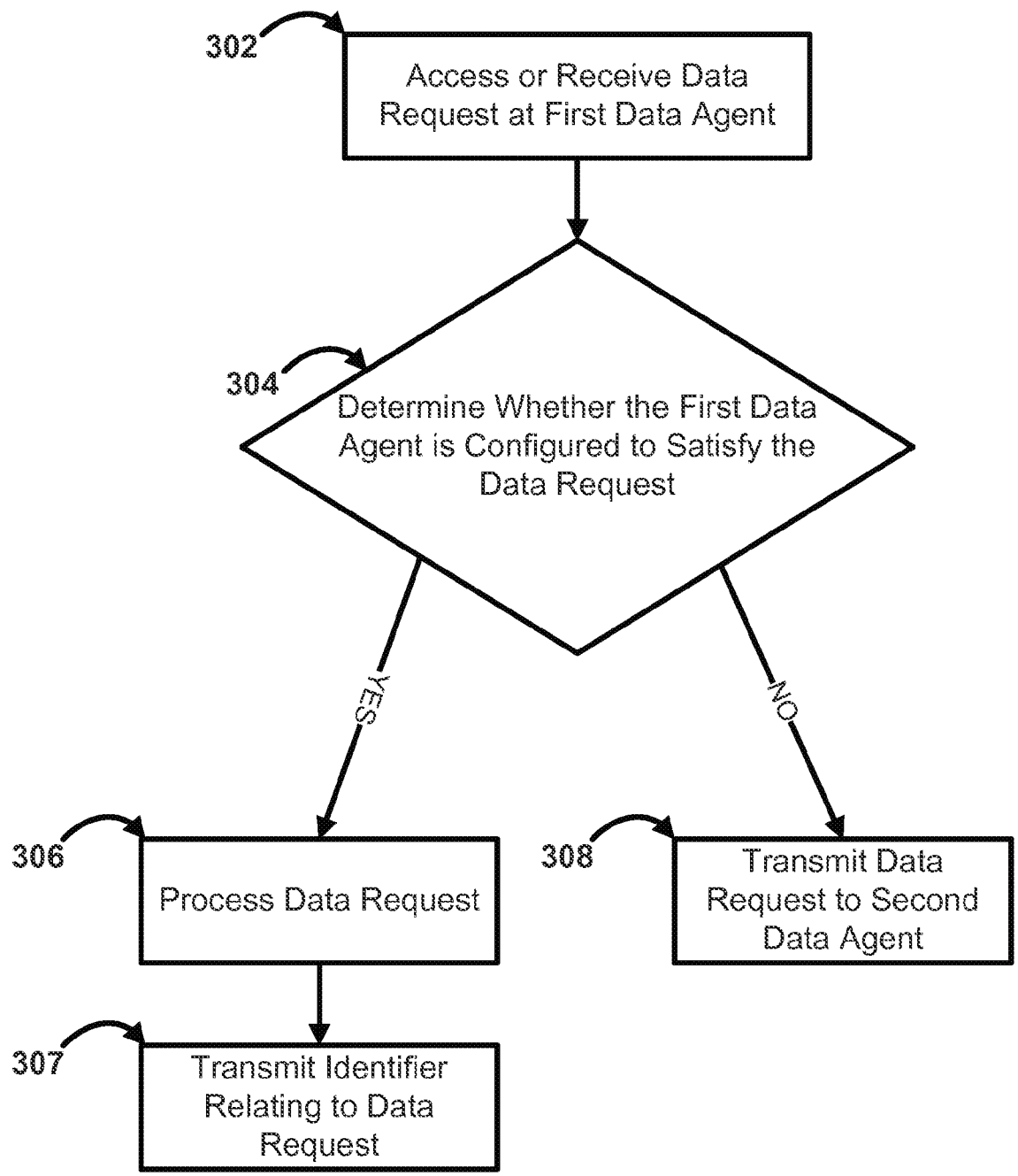
FIG. 3 is a flow chart of an exemplary method.

In an aspect, provided are methods for managing data. FIG. 3 illustrates an exemplary method. In step 302, a data request can be received at a first data agent. In an aspect, the data request can relate to one or more of a source and a destination. As an example, one or more of the source and destination can be configured as a data agent (e.g., a host of a data agent). The data request can comprise an identifier relating to content. The data request can comprise an authentication request, an upload request, a download request, a transfer request, a delete request, a statistics request, a status request, or a sign out request, or a combination thereof. In another aspect, a protocol can be associated with the data request.

In step 304, a determination can be made whether the first data agent is configured to satisfy the received data request. In an aspect, determining whether the first data agent is configured to satisfy the data request comprises one or more of, determining a protocol capability of the first data agent, determining a data type capability of the first data agent, determining a communication relationship of the first agent and one or more of the source host and the destination host, and determining a capacity of the first data agent.

In step 306, if the first data agent is configured to satisfy the data request, the data request can be processed via the first data agent. In an aspect, processing the data request via the first data agent can comprise asynchronously satisfying the data request. In step 307, a job identifier can be transmitted (e.g., to the source of the data request) if the first data agent is configured to satisfy the data request.

In step 308, if the data agent is not configured to satisfy the data request, the data request can be transmitted to a second data agent associated with the source host and the destination host. In an aspect, transmitting the data request to a second data agent can comprise executing a fairness algorithm. In an aspect, a fairness algorithm (e.g., min-max fairness) can be implemented by an allocation of resources if the allocation is feasible and an attempt to increase the allocation of any participant necessarily results in the decrease in the allocation of some other participant with an equal or smaller allocation. In another aspect, a fairness algorithm can be implemented such that a new configuration (e.g., data flow, transfer protocol) receive no larger share of the resources than a comparable configuration or flow. Other fairness algorithms can be used.

Figure 4:
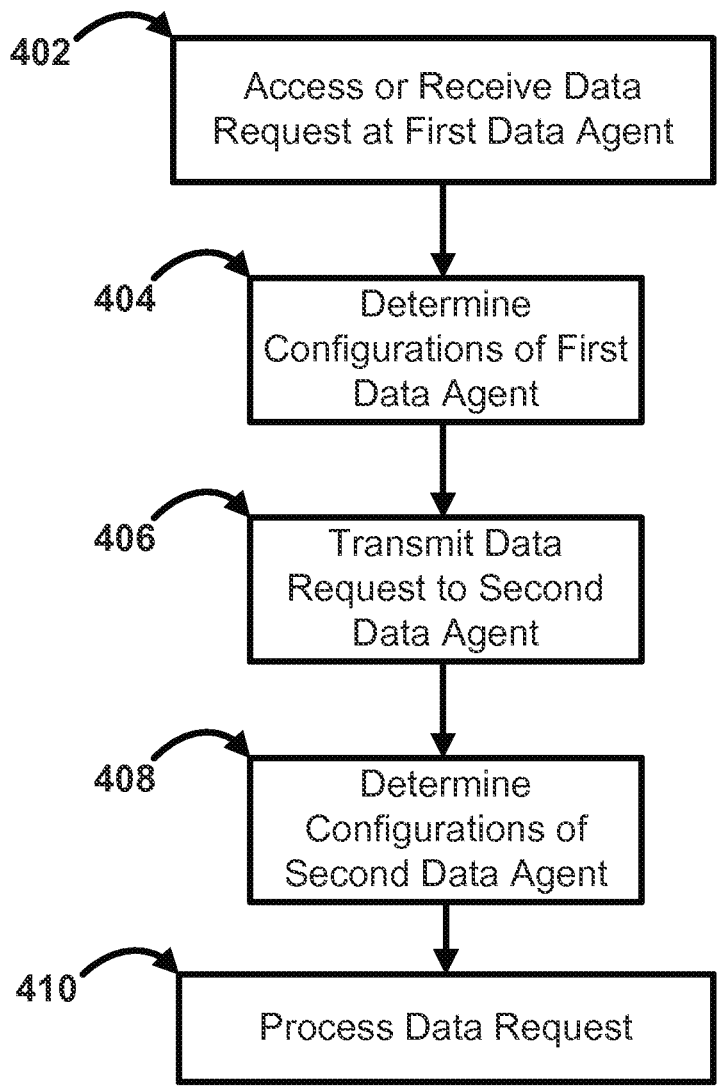
FIG. 4 is a flow chart of an exemplary method.

FIG. 4 illustrates an exemplary method for managing data. In step 402, a data request can be received or accessed by a first data agent. In an aspect, the data request can relate to a transfer protocol. As an example, the data request can comprise an authentication request, an upload request, a download request, a transfer request, a delete request, a statistics request, a status request, or a sign out request, or a combination thereof. As a further example, the transfer protocol can comprise FTP, HTTP, SFTP, or ASPERA, or a combination thereof.

In step 404, configurations of the first data agent can be determined. In an aspect, determining configurations can comprise determining whether the first data agent is configured to satisfy the data request. As an example, determining the configurations of the first data agent can comprise one or more of determining a protocol capability of the first data agent, determining a data type capability of the first data agent, determining a communication relationship of the first data agent and one or more of the source host and the destination host, and determining a capacity of the first data agent.

In step 406, the data request can be transmitted (e.g., delegated) to a second data agent. In an aspect, transmitting the data request to a second data agent can comprise executing a fairness algorithm. As an example, the transmission of the data request can be dependent upon failure and/or inability of the first data agent to satisfy the data request. In another aspect, the first data agent can have knowledge of at least the presence of the second data agent. As an example, the first data agent can transmit the data request to the second data agent using such knowledge (e.g., an identifier, locator, etc.). In an aspect, a fairness algorithm (e.g., min-max fairness) can be implemented by an allocation of resources if the allocation is feasible and an attempt to increase the allocation of any participant necessarily results in the decrease in the allocation of some other participant with an equal or smaller allocation. In another aspect, a fairness algorithm can be implemented such that a new configuration (e.g., data flow, transfer protocol) receive no larger share of the resources than a comparable configuration or flow. Other fairness algorithms can be used.

In step 408, configurations of the second data agent can be determined. In an aspect, determining configurations can comprise determining whether the second data agent is configured to satisfy the data request. As an example, determining the configurations of the second data agent can comprise one or more of determining a protocol capability of the second data agent, determining a data type capability of the first data agent, determining a communication relationship of the second data agent and one or more of the source host and the destination host, and determining a capacity of the second data agent.

In step 410, the data request can be processed by one or more of the first data agent and the second data agent. In an aspect, processing the data request can comprise asynchronously satisfying the data request.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving a data request at a first data agent, the data request relating to a source host, a destination host, and a transfer protocol;
   determining whether the first data agent is configured to satisfy the data request based on a determination of an association between the first data agent and the destination host, and an association between the first data agent and the transfer protocol;
   if the first data agent is configured to satisfy the data request, processing the data request via the first data agent; and
   if the first data agent is not configured to satisfy the data request, transmitting the data request to a second data agent associated with one or more of the source host, the destination host, and the transfer protocol.

2. The method of claim 1, wherein the data request comprises an identifier relating to content.

3. The method of claim 1, wherein the data request comprises an authentication request, an upload request, a download request, a transfer request, a delete request, a statistics request, a status request, a sign out request, or a combination thereof.

4. The method of claim 1, wherein one or more of the source host and the destination host is a computing device.

5. The method of claim 1, wherein a protocol associated with the source host is different from a protocol associated with the destination host.

6. The method of claim 1, wherein processing the data request via the first data agent comprises asynchronously satisfying the data request.

7. The method of claim 1, wherein determining whether the first data agent is configured to satisfy the data request comprises one or more of determining a protocol capability of the first data agent, determining a data type capability of the first data agent, determining a communication relationship of the first agent and one or more of the source host and the destination host, and determining a capacity of the first data agent.

8. The method of claim 1, wherein transmitting the data request to a second data agent comprises executing a fairness algorithm.

9. The method of claim 1, further comprising transmitting a job identifier if the first data agent is configured to satisfy the data request.

10. A method comprising:
receiving a data request at a first data agent, the data request comprising a transfer protocol to be used to fulfill the data request;
determining whether the first data agent is configured to satisfy the data request based on an association between the first data agent and the transfer protocol;
if the first data agent is configured to satisfy the data request using the transfer protocol, satisfying the data request via the first data agent; and
if the first data agent is not configured to satisfy the data request, delegating the data request to a second data agent, wherein the second data agent is associated with the transfer protocol.

11. The method of claim 10, wherein the data request comprises an authentication request, an upload request, a download request, a transfer request, a delete request, a statistics request, a status request, a sign out request, or a combination thereof.

12. The method of claim 10, wherein the transfer protocol comprises file transfer protocol (FTP), hypertext transfer protocol (HTTP), Secure Shell (SSH) file transfer protocol (SFTP), ASPERA, or a combination thereof.

13. The method of claim 10, wherein determining whether the first data agent is configured to satisfy the data request comprises one or more of determining a protocol capability of the first data agent, determining a data type capability of the first data agent, determining a communication relationship of the first agent and one or more of the source host and the destination host, and determining a capacity of the first data agent.

14. The method of claim 10, wherein the first data agent has knowledge presence of the second data agent.

15. A system comprising:
a plurality of computing devices comprising hardware and software, wherein one or more of the plurality of computing devices is associated with one or more of a plurality of transfer protocols; and
a first data agent in communication with a first group of the one or more of the plurality of computing devices, wherein the first data agent is configured to receive a data request relating to a source host, a destination host, and a transfer protocol, determine whether the first data agent is configured to satisfy the data request based on a determination of an association between the first data agent and the destination host, and an association between the first data agent and the transfer protocol, if the first data agent is configured to satisfy the data request, process the data request via the first data agent, and if the data agent is not configured to satisfy the data request, transmit the data request to a second data agent associated with one or more of the source host, the destination host, and the transfer protocol.

16. The system of claim 15, wherein the data request comprises an authentication request, an upload request, a download request, a transfer request, a delete request, a statistics request, a status request, a sign out request, or a combination thereof.

17. The system of claim 15, wherein two or more of the plurality of computing devices are associated with different transfer protocols.

18. The system of claim 15, wherein the second data agent is in communication with a second group of the one or more of the plurality of computing devices, wherein the second data agent is configured to satisfy data requests relating to the second group of the one or more of the plurality of computing devices, and wherein the first group of one or more of the plurality of computing devices comprises at least one of the plurality of the computing devices that is not part of the second group of the one or more of the plurality of computing devices.

19. The system of claim 15, wherein the second data agent is in communication with a second group of the one or more of the plurality of computing devices, wherein the second data agent is configured to satisfy data requests relating to the second group of the one or more of the plurality of computing devices, and wherein the second group of one or more of the plurality of computing devices comprises at least one of the plurality of the computing devices that is not part of the first group of the one or more of the plurality of computing devices.

20. The system of claim 15, wherein the first data agent is further configured to transmit a job identifier to a source of one or more data requests.

* * * * *